(12) United States Patent
Vijayendran et al.

(10) Patent No.: US 7,887,982 B2
(45) Date of Patent: Feb. 15, 2011

(54) BIO-BASED TONER (75) Inventors: Bhima R. Vijayendran, Dublin, OH (US); Jerry L. King, II, Crawfordsville, IN (US)

(73) Assignee: Battelle Memorial Institute, Columbus, OH (US)

( * ) Notice: Subject to any disclaimer, the term of this patent is extended or adjusted under 35 U.S.C. 154(b) by 565 days.

(21) Appl. No.: 11/908,883

(22) PCT Filed: Mar. 20, 2006

(86) PCT No.: PCT/US2006/010136

§ 371 (c)(1),
(2), (4) Date: Nov. 1, 2007

(87) PCT Pub. No.: WO2006/102280

PCT Pub. Date: Sep. 28, 2006

(65) Prior Publication Data

US 2008/0145775 A1 Jun. 19, 2008

Related U.S. Application Data

(60) Provisional application No. 60/663,422, filed on Mar. 18, 2005, provisional application No. 60/758,757, filed on Jan. 13, 2006.

(51) Int. Cl.
*G03G 9/00* (2006.01)
(52) U.S. Cl. .................. 430/109.3; 430/109.4
(58) Field of Classification Search .............. 430/109.3, 430/109.4
See application file for complete search history.

(56) References Cited

U.S. PATENT DOCUMENTS

| 5,102,762 | A | 4/1992 | Tyagi et al. |
| 5,306,590 | A | 4/1994 | Felder |
| 5,959,066 | A | 9/1999 | Charbonneau |
| 6,025,061 | A | 2/2000 | Khanarian et al. |
| 6,063,464 | A * | 5/2000 | Charbonneau et al. ... 428/36.92 |
| 6,107,447 | A | 8/2000 | Kreuder et al. |
| 2004/0092703 | A1 * | 5/2004 | Germroth et al. .......... 528/298 |

FOREIGN PATENT DOCUMENTS

WO WO2004077169 9/2004

* cited by examiner

*Primary Examiner*—Mark A Chapman
(74) *Attorney, Agent, or Firm*—James David Johnson (57) ABSTRACT

A series of resins were synthesized using a range of bio-based materials to control the molecular architecture, and therefore the properties, of the inventive resins. The resins were formulated into toner formulations such as those useful in printers and copiers.

15 Claims, 6 Drawing Sheets y can range from 0 to 500, preferably 3 to 30
z can range from 0 to 700, preferably 9 to 70
u can range from 0 to 250, preferably 1 to 10

BIO-BASED TONER

This application claims the benefits of Provisional Application No. 60/758,757 filed Jan. 13, 2006; and Provisional Application No. 60/663,422 filed Mar. 18, 2005.

The contents of the provisional applications are incorporated by reference herein.

BACKGROUND OF THE INVENTION

Briefly, there is a need for improved toners that can be charged either positively or negatively for use in office copiers and laser printers. The improvements sought are in the areas of improved flow and wetting, lower energy for fusing, ability to deink toners from office waste paper, and toner resins that are derived from renewable resources. The ability of the resin to inherently provide negative charging to tone positively charged latent electrostatic images is of greater interest as a significant share of the copier and printer market use such toning system. Conventional toners are based on synthetic resins such as styrene acrylates, polyesters, polyamides, etc. Resins derived from a renewable resource feedstocks such as corn, soybeans and other plants are gaining wider interest due to environmental sustainability long term supply concerns with petroleum-derived resins. Examples of bio-based resins are derived from dimer acid and D-isosorbide that have good toning and printing features like the current petroleum resin-based toners.

There is also a need for toners incorporating resins with the ability to disperse pigments. Bio-based polyester resins derived from dimer acid and D-isosorbide, used in powder coating formulations, gave a final coating with improved pigment dispersion. There is also a need for resins that flow at lower fusing temperature to minimize the energy consumption to operate a copier.

There is a great deal of interest in the replacement of some petrochemical feedstocks with bio-based feedstocks for use in a wide range of application areas. Evidence of this interest is reflected in the number of review articles that have been published through the years. Efforts to utilize bio-based feedstock in the synthesis of polyester resins are exemplified in U.S. Pat. No. 6,063,464, wherein corn bio-mass derived isosorbide is used in the synthesis of polyester materials.

Related art includes U.S. Pat. No. 5,959,066; U.S. Pat. No. 6,025,061; U.S. Pat. No. 6,063,464; and U.S. Pat. No. 6,107,447.

BRIEF DESCRIPTION OF THE INVENTION

Broadly the invention provides for a toner that has a negative charge or a positive charge. The toner is typically used in electrostatic type copying and printing machines.

A first embodiment of the invention provides for a toner including a coloring agent and a thermoplastic polymer. Typically the toner comprises particles having a mean particle size range of less than about 30 micrometer, more preferably a mean particle size range of less than about 25 micrometer, and most preferably a mean particle size range of less than about 20 micrometer. Typically excipients selected from the group consisting of charge control agents, flow control agents, lubricants, anticaking agents, and mixtures thereof are used. In some typical embodiments, the toner has a negative triboelectric charge of between about 10 to about 40 microCoulomb/g and more preferably a negative tribo-electric charge of between about 10 to about 20 microCoulomb/g. Some typical embodiments provide for a toner having a polymer glass transition temperature of between about 50° C. to about 70° C.

In one embodiments of the invention the toner is used with printing and copying paper.

In yet further embodiments of the invention, a method is provided for making a negative or positive charging toner by the step of compounding a coloring agent and a thermoplastic polymer. Typically toner compounding includes powder mixing on a hot roll mill or the polymers resin for the toner can be extruded with dispersed coloring agent. Typically the compounded toner is micronized and if needed classified for appropriate particle size distribution according to the application.

Another embodiment of the invention provides for a toner including an amorphous thermoplastic polymer selected from the group consisting of (1) a carboxyl or hydroxyl functional polyester; (2) a polyester ether; (3) a polyurethane; and wherein the polymer is derived from at least one bio-based monomer; and the polymer has a $T_g$ between about 50° C. and about 80° C.;

b. a coloring agent; and wherein the toner comprises a powder having a mean particle size of less than about 30 um. In one embodiment the carboxyl functional polyester is derived from a dianhydrohexitol moiety (e.g. an isosorbide moiety), a first diacid moiety, and/or a second diacid moiety, optionally a monoacid may also be included. In a further embodiment the isosorbide moiety is D-isosorbide, the first diacid is 1,4-cyclohexanedicarboxylic acid, and the second diacid is a long chain diacid having eight or more carbon atoms in the chain.

Another embodiment of the invention provides for a toner including an amorphous thermoplastic polymer selected from the group consisting of (1) a carboxyl or hydroxyl functional polyester; (2) a polyester ether; (3) a polyurethane; and wherein the polymer is derived from at least one bio-based monomer; and the polymer has a $T_g$ between about 50° C. and about 80° C.;

b. a coloring agent; and wherein the toner comprises a powder having a mean particle size of less than about 30 um. In one embodiment the carboxyl functional polyester is derived from a dianhydrohexitol moiety (e.g. an isosorbide moiety), a first diacid moiety, and/or a second diacid moiety, optionally a monoacid may also be included. In a further embodiment the isosorbide moiety is D-isosorbide, the first diacid is 1,4-cyclohexanedicarboxylic acid, and the second diacid is a long chain diacid having eight or more carbon atoms in the chain.

In a yet further embodiment, the toner includes (1) a thermoplastic polyester resin that is the reaction product of A. a dianhydrohexitol; B. a dimer diol and/or a dimer diacid; C. a diacid, diester, or diacid chloride; and D. an optional catalyst; and (2) a pigment.

A yet additional embodiment provides for a developer that includes (1) a thermoplastic polyester resin comprising the reaction product of A. a dianhydrohexitol; B. a dimer diol and/or a dimer diacid;

C. a diacid, diester, or diacid chloride; and D. an optional catalyst;

(2) a pigment; and (3) a carrier.

In some embodiments the developer comprises a magnetic material.

A yet further embodiment of the invention provides for an image prepared with a negative or positive charge toner composition including a coloring agent and a thermoplastic polymer.

DETAILED DESCRIPTION OF THE INVENTION AND BEST MODE

Broadly the invention combines the desired use of bio-based feedstock with the need for bio-based toners. Corn and soy feedstocks can be utilized to make resins with a balance of properties appropriate to toner performance. These resins can then be formulated into a variety of toner formulations.

Typically, in one embodiment a toner according to the invention is prepared by: Pulverizing the principal resin, dry blending with a pulverized colorant, and selected pulverized additives; additional micronization can be used. In a preferred embodiment the polymer resin is mixed with a colorant, extruded and micronized. The blend can be micronized or pulverized to a desired particle size, and finally the resulting toner powder is classified into the final particle size. A carrier it typically mixed with the toner for application to a substrate from which the carrier is typically separated after application.

Bio-based products as used herein for some embodiments of the invention means products are derived at least in part from conversion of agricultural and forest based renewable resources processed by conventional chemical modifications and/or by biological processes such as fermentation. The carbon source is derived from a renewable plant crop/tree resource unlike conventional fossil derived carbon source that is finite and is fast depleting.

There are a number of polymer properties that are important for toner performance. The key properties that were focused on were:

Negative or positive tribo-electric charge with a target of 10 to 40 microCoulomb/gm. Greater negative or positive tribo-electric charge than about 10 microCoulomb/g is typically required to produce an acceptable copy since image quality is affected by the magnitude of the charge.

Polymer glass transition temperature (Tg) with a target of 50° C. to 70° C. Acceptable fusing and blocking resistance (i.e. toner powder caking on storage) is strongly influenced by Tg.

A basic toner composition of 10% carbon and 90% polymer was used herein. However, any ratio of colorant to polymer desired can be selected so long as the toner provides the properties needed for adhesion, fusion and so on to retain the coloring agent on the substrate to which it is applied. Other additives noted below may be included in typical toners to obtain desired toner performance: Knowing the teachings of the invention, those skilled in the art are able to select additives and materials to obtain the desired the charge properties.

Flow control agents—to provide good powder flow. Examples include fumed silica and finely ground grains.

Surface Additives—typically lubricants to prevent toner offset to the fuser rolls, cleaning aids, tribo-electric charging; toner flow and handling; e.g. Aerosil (R972), Titania (P25) to provides tribo-electric charge stability, zinc stearate acts as a charge rate improver and as a blade cleaner lubricant; kynar (fluoropolymer)—as a lubricating additive.

Colorants—black, e.g. carbon black, magnetite, or a combination of both; highlight color, full color gamut; typical color pigments—cyan—substituted metallo-phthalocyanines, Magenta—quinacridones, azonapthols, aminofluorenes (xanthenes), yellow, bisazo derivatives of diaminobiphenyl, monoazo compounds.

Dispersal agent—and additive that prevents or reduces agglomeration of pigments and provides for fuller development of the colorant in the toner. I the present invention some of the resins can act as internal dispersal agents as for example the material in Example 3F.

Bulk additives—fusing and release promoters, e.g. wax.

Magnetic additives—typically for toner containment, development properties, color, cleaning.

Conductive and nonconductive additives—typically added to control toner conductivity. For example, silica can be added to control the conductivity of the carbon black.

Charge Control Agents—added to provide the correct sign and magnitude of tribo-electric charge; for controlled charging rate; fusing parameters and fuser life; e.g. Aerosil R972.

Typical thermoplastic polymers (and their monomers) useful with the invention either alone or as admixtures to a major ingredient include polyamides, polyesters, polyester ethers, polyurethanes, blends with acrylates or polyamides, and mixtures thereof. Styrene content in polystyrene acrylate may be useful for controlling negative charge. Polystyrene acrylate having a higher styrene content when admixed to the polymers herein is expected to improve the amount of negative charge.

Mixture as used herein can be a collection of components or materials where they are substantially uniformly dispersed; typically since one ingredient is a thermoplastic polymer the components or materials are melt blended together.

Degree of polymerization—it has been found by tests herein that the best materials have a degree of polymerization that provides a solid toner material at room temperature yet processes easily and quickly at typical toner temperatures. The materials should flow easily onto paper or other substrate and adhere well upon being heated above their Tg. Typical degrees of polymerization include 5-80 units. The material should not be brittle so as to break up and produce unwanted dust.

In addition, blends of different molecular weight polymers may be used to provide the desired melt rheology for acceptable fusing behavior. In the examples herein the additives used were minimized; in general, fumed silica can be added to aid in powder flow to achieve good magnetic brush formation. The basic toner composition used throughout was 90% resin and 10% carbon black. Regal 330, RAVEN, and carbon black from Cabot Corp. are typical useful carbon blacks.

A resin that is particularly useful according to the present invention has a good balance of two apparently contradictory properties:

(1) A low viscosity at melt for good flow-out on application, which is characteristic of amorphous resins, but must also have, (2) A relatively high glass transition temperature ($T_g$) for good storage stability, characteristic of crystalline resins. If the Tg is too low, the powder particles will be "soft" and will coalesce into an unusable mass on storage, especially at elevated storage temperatures. Typically, these properties are balanced by blending crystalline and amorphous resins into effectively semi-crystalline resin blends. Typically resins obtained according to the present invention provide these desired properties.

Note: Unless otherwise specified % when referring to the amount of an ingredient refers to weight percent (wt %).

There are three general approaches for resin synthesis useful for the invention disclosed herein:

1. Hydroxyl functional polyesters based upon dimer diols, isosorbide-derived diols and/or dimer acids. Typically the carboxyl or hydroxyl functionality of the polyester is determined by the ratio of the molar excess of either the diacid or the diol groups. The polyesters typically have a net bio-based content of at least about 5 wt %, but most typically about 20 to about 50 wt %

2. Carboxyl functional polyesters based upon dimer diols, isosorbide-derived diols and/or dimer acids. Typically the carboxyl or hydroxyl functionality of the polyester is determined by the ratio of the molar excess of either the diacid or the diol groups. The polyesters typically have a net bio-based content of at least about 5 wt %, but most typically about 50 to about 70 wt %

The polyester polyol resins disclosed herein are useful in toners and pigment dispersion agents.

The present invention also pertains to the use of one or more of these bio-based materials in a variety of applications including, but not limited to toners. Resins for one embodiment were designed that would have a glass transition temperature ($T_g$) of less than about 80° C., other embodiments having a glass transition temperature of less than about 70° C., yet further embodiments of less than about 60° C., with appropriate melt rheology. A resin according to a broad general embodiment of the invention has a minimum glass transition temperature of at least about 20° C. and a maximum of about 80° C., with appropriate melt rheology. Resins useful for flow control typically are at the lower end of the glass transition temperature range (e.g. Example 3B where the Tg is about 28.4° C.), however they can range from about 20° C. to about 80° C., and on some embodiments can typically be about 25° C. to about 60° C. Low $T_g$ materials can be mixed with high $T_g$ materials to provide a range of properties.

Figure 3:
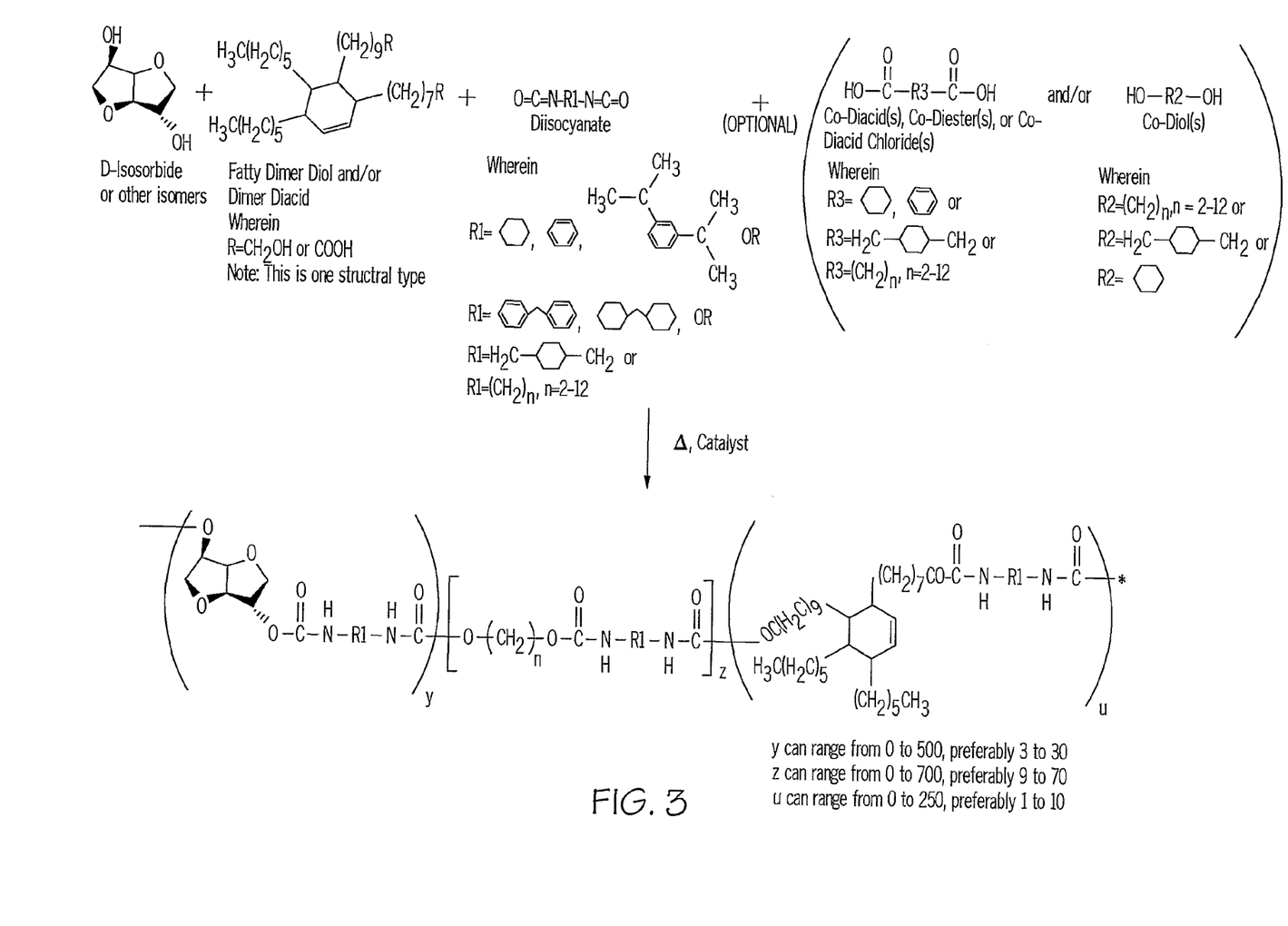
FIG. 3 is a schematic flow chart that shows a synthetic pathway toward polyurethanes blending hard, crystalline isosorbide with dimer diol, amorphous dimer diacids, polyisocyanates (e.g. diisocyanate), and other ingredients.

Resins according to the invention can be comprised of co-reacted components that tend to contribute rigidifying effects, such as isosorbide (typically from corn feedstock), and components that contribute flexiblizing effects, such as dimer acid or dimer diol (typically from vegetable oil feedstocks). By appropriately co-reacting these components into resins both the flow-out and storage stability of the resin can be controlled. In general, rigidifying components contain functional chemical groups, such as alcohol, ester, carboxylic acid or acid chloride, attached to a cyclic structure which limits their mobility whereas the flexiblizing components contain functional chemical groups attached to aliphatic carbon chains. Isosorbide is a diol comprised of fused cyclic ether rings and is a member of a larger family of bio-based sugar derivatives commonly referred to as dianhydrohexitols. Dimer acid and dimer diol are di-carboxylic acids and di-alcohols, respectively, derived from bio-based fatty acids which are largely aliphatic in nature. Similarly these rigidifying and flexiblizing effects may also apply to polyurethanes as depicted in FIG. 3.

The present invention also concerns the formulation of a toner from the one or more inventive resins. A distinguishing characteristic of one toner embodiment is negative charge, good flow, good fusability, and good pigment dispersion.

A key characteristic of resins used for toner formulations is the glass transition temperature ($T_g$) which is typically at least about 50° C. and preferable at least about 60° C. for storage stability of the ultimate toner powder. Table 1 shows a list of several soy-based resins, their functionality, and their $T_g$. This Table illustrates the difficulty of producing a resin with an acceptable $T_g$ from materials that include low-viscosity soy-based monomers.

TABLE 1

Soy-based resins

| Resin No. | Functionality | Tg (° C.) (if available) |
|---|---|---|
| R-1 | Amido-amine | 61 |
| R-2 | Hydroxyl | 45 |
| R-3 | Hydroxyl | 28 |
| R-4 | 100% Hydrogenated Polyester polyol | Waxy |
| R-5 | 50% Hydrogenated Polyester polyol | Waxy |
| R-6 | Polyester | Waxy |

Only Resin 1 met the criteria for $T_g$. To achieve higher $T_g$s and maintain a high loading of bio-based material in the resins, isosorbide, another bio-based material, but one with high inherent $T_g$ contribution was utilized.

For example, a higher $T_g$, bio-based material (derived from isosorbide that was derived from corn feedstock) was identified that can be co-reacted with the soy-based materials to give resins with a high bio-based content and a sufficiently high $T_g$ for use in the toner formulations. Soy based materials and other ingredients an be selected to achieve an appropriate balance of properties in the resins and ultimately the toner.

Resin Synthesis (See Examples 1 and 2):

The use of bio-based materials in the production of toners can be described as follows:

A polyester polymer is prepared by (1) mixing in a reactor isosorbide (derived from corn feedstock); fatty dimer diol and/or dimer diacid (derived from soybean feedstock); a diacid, diester, or diacid chloride; optional co-diol(s); and optional co-diacid(s), co-diester(s) or co-diacid chloride(s), with a condensation catalyst suitable for polymerizing aromatic diacids and diols; and (2) heating the monomers and catalyst to polymerize the monomers to yield a polyester. (See FIG. 1)

A carboxyl functional polyester resin is prepared by (1) mixing in a reactor isosorbide; fatty dimer diacid; optional co-diacid(s), co-diester(s) or co-diacid chloride(s); and optional co-diol(s); with a condensation catalyst; and (2) heating the monomers and catalyst to polymerize the monomers to yield a carboxyl functional polyester resin. (See FIG. 2)

A hydroxyl, carboxyl, or isocyanate functional polyurethane is prepared by (1) mixing in a reactor isosorbide; fatty dimer diacid and/or dimer diol; a polyisocyanate; optional co-diol(s); and optional co-diacid(s), co-diester(s), or co-diacid chloride(s), with or without a catalyst suitable for polymerizing diols and diacids with polyisocyanates; and (2) heating the monomers and optional catalyst to polymerize the monomers to yield a polyurethane. (See FIG. 3)

Figure 1:
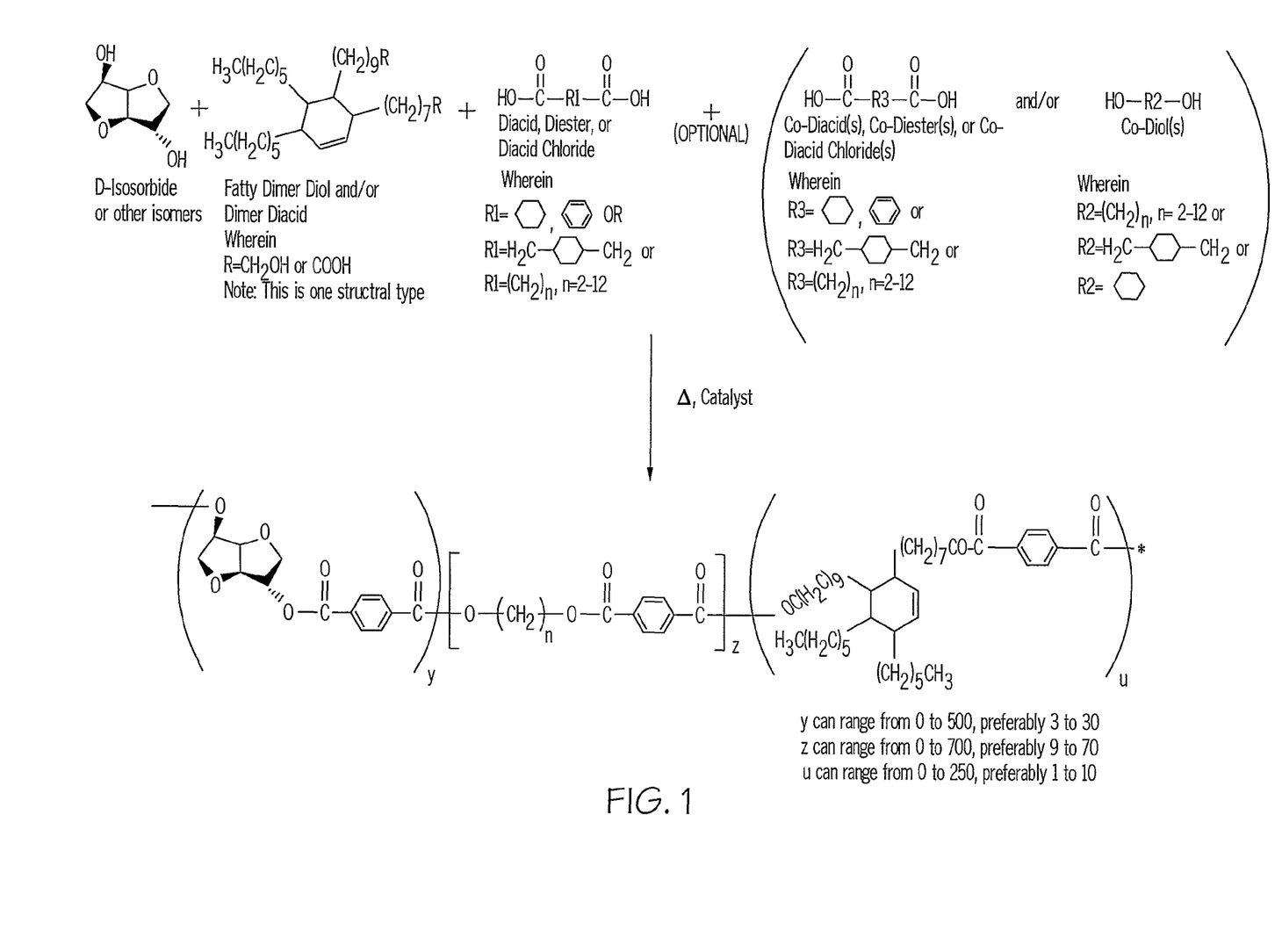
FIG. 1 is a schematic flowchart that shows a synthetic pathway toward polyester materials blending hard, crystalline isosorbide with amorphous dimer diols, aromatic diesters and other ingredients.
Figure 2:
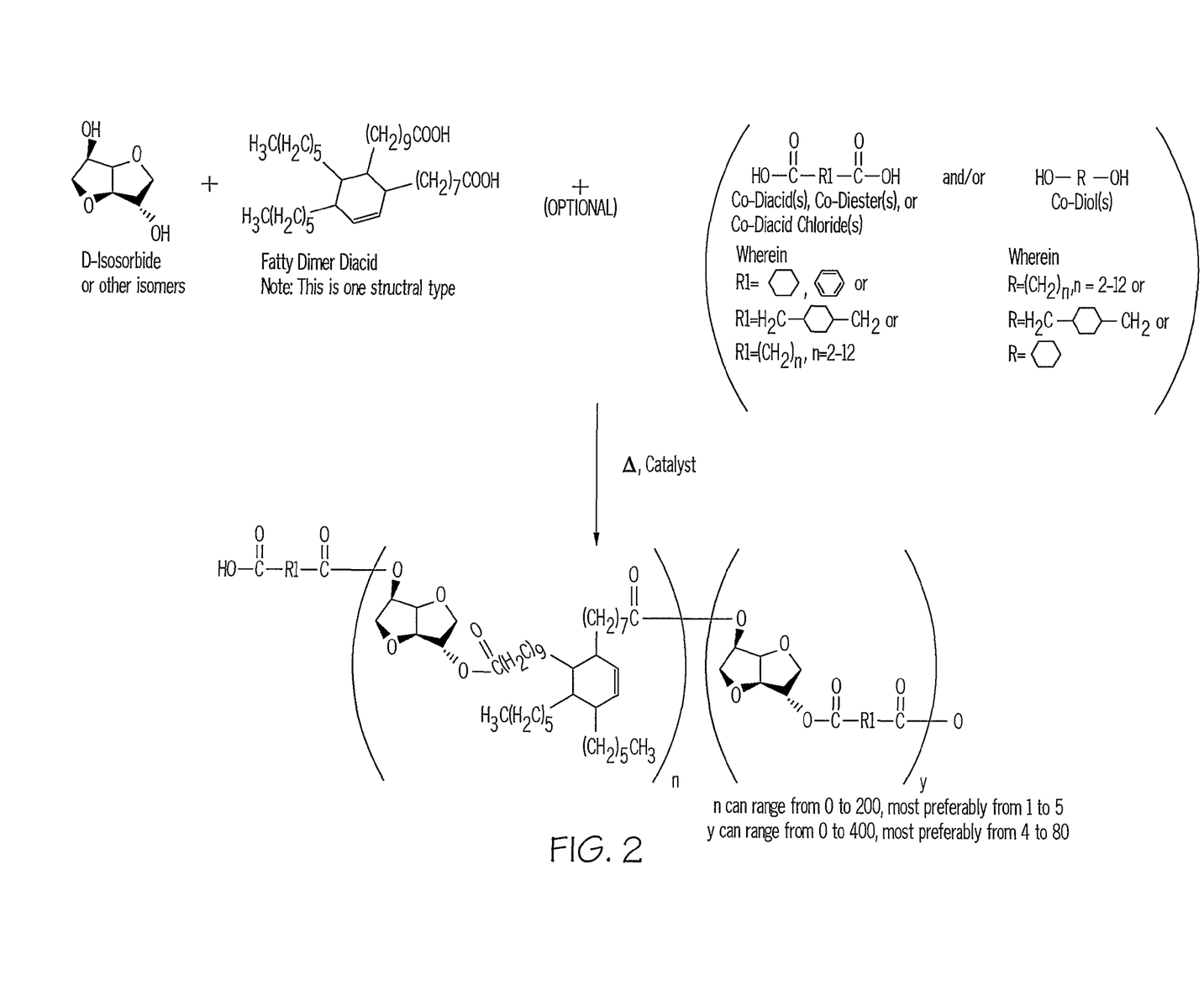
FIG. 2 is a schematic flowchart that shows a synthetic pathway toward polyester acids blending hard, crystalline isosorbide with amorphous dimer diacids and other ingredients. These can be utilized specifically in toners.

Referring now to FIGS. 1, 2, and 3 that disclose various reactants useful for the embodiments herein. In addition to the disclosed dimer diols and dimer acids the invention according to a broad embodiment includes aliphatic chains typically having from about 4 to about 20 carbon atoms. More preferably, the aliphatic chains have about 6 to about 16 carbon atoms.

The additional disclosed dimer diols and dimer acids include a six member ring with two side chains being an aliphatic side chain of about 4 to 20 carbon atoms and the other two side chains of about 8 to 12 carbon atoms with an alcohol or carboxylic functional group.

Additionally, the diesters, diacids, co-diacids and co-diesters may have the formula $R_2$—CO—$R_1$—CO—$R_2$ wherein $R_2$=—OH, —$OR_3$, or —Cl, wherein $R_3$=an aliphatic chain having from one to four carbon atoms. $R_1$ can be an aromatic group or an aliphatic group having from 2 to 12 carbon atoms.

Although not wishing to be bound by theory, it is presently believed that the aliphatic side chains in the dimer acid and dimer diol provide a low viscosity property for the resins. The aliphatic side chains tend to soften at low temperatures causing lowered viscosity and better flow. The longer the chain the more softening will be seen and the faster it will soften on heating.

They are also believed to provide in some embodiments improved pigment dispersion as illustrated in Example 9. One consequence of better flow is superior wetting of pigment, thereby improving pigment dispersion.

Additionally and more broadly, dihanhydrohexitols can be use din the invention. Thus other dianhydrohexitols can replace D-isosorbide or its isomers in preparing rigidifying structures by means of incorporating bicyclic containing other cyclic diols can be used in the invention. Diols incorporating cyclohexyl, isophorone, and other cyclic structures can add the rigidifying effect similar to isosorbide.

Dimer diacids are typically viscous liquids produced by the dimerization of $C_{18}$ unsaturated fatty acids. There are three biosources of $C_{18}$ unsaturated fatty acids; vegetable, tall oil, and animal. The $C_{18}$ units can be linked together in several ways. Four main structural types are known for the predominant component, the $C_{36}$ diacids; acyclic, monocyclic, bicyclic, and aromatic. There are also many structural isomers for each of these structural types. The distribution of these structural types and isomers is dependent on the mono/poly-unsaturation ratio of the starting fatty acid feedstock and the process conditions employed for dimerization. The smallest dimer diacid typically used in some embodiments is a $C_{18}$ diacid.

Four types of dimer diacids are currently commercially available; (1) standard (undistilled), which contain about 80% $C_{36}$ dibasic acids, (2) distilled, in which the $C_{36}$ dibasic acid content has been enhanced to 92-98%, (3) distilled and partially hydrogenated for improved color, and (4) distilled and fully hydrogenated for maximum stability.

The dimer acids used to prepare the bio-based polyester resins were Empol 1018® (Examples 3 and 3C) and Pripol 1013® (Example 2), both vegetable-based dimer acids. Empol 1018® is manufactured by Cognis Corporation and Pripol 1013® is manufactured by Uniqema. Cognis has since discontinued their vegetable-based dimer acid production in favor of tall oil-based dimer acid. Table 1A compares the physical properties and composition of Pripol 1013® and Empol 1018®. Pripol 1013® is lighter in color and has a higher dibasic acid content. The resultant carboxyl functional resins using the two different dimer acids had similar physical properties.

TABLE 1A

Dimer Acid Compositions and Properties

| Dimer Acid | Empol ® 1018 (Batch #U42G151910) | Pripol ® 1013 (Batch #091687) |
|---|---|---|
| Acid Value | 193.5 | 195 |
| Color, Gardner | 8 | 3-4 |
| Composition | | |
| wt % Monobasic Acid | 5 | 0.1 |
| wt % Dibasic Acid | 81 | 97 |
| wt % Polybasic Acid | 14 | 3 |

Dimer diol is typically produced by high-pressure hydrogenation of dimer diacid methyl ester. The dimer diol used to prepare the bio-based polyester resins (Example 1, 1A, and 3B) was SPEZIOL C36/2 1075® dimer diol. This is a vegetable-based dimer diol produced by Cognis.

The resins disclosed herein have low viscosity relative to commercial petrochemically-based resins once melted (see examples). In toner formulations, it may be necessary to add flowable materials (flow control additives) in order to get good fusion and other acceptable copy properties. The bio-based resins require little or no such additives to achieve good film leveling and appearance. The bio-based resins can also function as flow additives themselves in formulations containing conventional petrochemically-based resins in which they were successfully incorporated.

The inventive polyester polymers were prepared by melt polymerization of isosorbide, dimer diol and/or dimer acid, a diacid, diester, or diacid chloride; optional co-diol(s); and optional Co-diacid(s), co-diester(s) or co-diacid chloride(s) (Method from FIG. 1)

A typical procedure used to prepare a hydroxyl functional polyester is described in Example 1. Aliphatic polyesters are soft, flexible rubbery materials. Most aromatic polyesters are crystalline. Blending the soft dimer diols with the highly functional isosorbide and with the crystalline aromatic diacids results in a good balance of properties. This balance can be helped, however, by including other materials, such as ethylene glycol in the reaction (i.e., as the "diol" in FIGS. 1 and 2).

The effect of various monomers was studied by preparing polyesters with glass transition temperatures ($T_g$s) ranging from 61° C. to 165° C. (Tables 2A and 2B). Table 2A shows typical properties of resins synthesized as described herein and the effects of various monomers with glass transition temperatures ($T_g$s) ranging from 61° C. to 165° C. Table 2B shows typical properties of carboxyl functional resins synthesized as described in examples 2-3.

TABLE 2A

Polyester polyols based on soy-derived dimer diol and/or corn-derived isosorbide

| EXAMPLE | Dimer Diol (mole %)[a] | Isosorbide (mole %) | Ethylene Glycol (mole %) | Dimethyl-terephthalate (mole %) | $T_g$ (° C.) | Inherent Viscosity (dl/g)[b] | Hydroxyl Value (mg KOH/g) | Acid Value (mgKOH/g) |
|---|---|---|---|---|---|---|---|---|
| Example 1 | 5.8 | 14.9 | 27.8 | 51.5 | 61 | 0.29[c] | 23.3 | 8.0 |
| Example 1A | 12.2 | 38.0 | 0 | 49.8 | 165 | 0.10 | 40.9 | 2.6 |
| Example 3B | 10.8 | 17.1 | 22.7 | 49.4 | 28.4 | 0.19 | 35.4 | 6.1 |

Notes
[a]Dimer diol based polyester resin % compositions were calculated based upon the NMR of the final resin and are in mole %
[b]Measured on a 1% (weight/volume) solution of the polymer in o-chlorophenol at a temperature of 25° C.
[c]Only 92% soluble in o-chlorophenol.
ND = not determined

TABLE 2B

Polyester carboxylic acids based on soy-derived dimer acid and corn-derived isosorbide

| Example # | Dimer Acid (wt %)[a] | Isosorbide (wt %) | 1,4-CHDA (wt %) | Tg (° C.) | Inherent Viscosity (dl/g)[b] | Hydroxyl Value (mg KOH/g) | Acid Value (mg KOH/g) |
|---|---|---|---|---|---|---|---|
| Example 2 | 19.4 | 37.1 | 43.4 | 64.2 | ND | ND | 34.8 |
| Example 3 | 16.1 | 38.4 | 45.5 | 66.9 | 0.25 | 13.0 | 36.3 |

Notes
[a]Dimer acid based polyester resin composition calculations were based upon initial charge weights
[b]Measured on a 1% (weight/volume) solution of the polymer in o-chlorophenol at a temperature of 25° C.
ND = not determined The data shows the large range of $T_g$s possible with these monomers. A test polyester prepared without isosorbide was not amorphous like those containing isosorbide but was crystalline in behavior.

Figure 4:
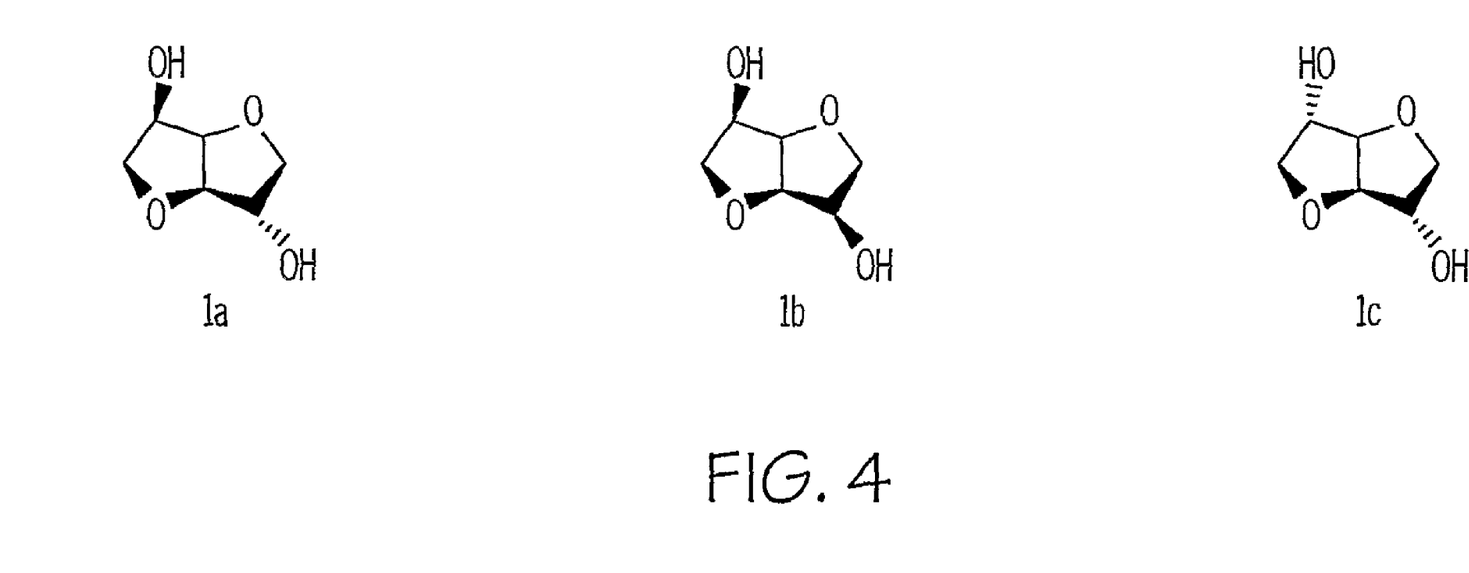
FIG. 4 illustrates typical isomers of isosorbide (1a, 1b, and 1c) that are useful with the invention.

D-Isosorbide (1,4:3,6-dianhydro-D-glucitol) (1a) or isomers thereof and/or mixtures of all isomers, including D-Isosorbide, could be used in place of D-Isosorbide. 1,4:3,6-dianhydro-D-mannitol (1b) and 1,4:3,6-dianhydro-D-iditol (1c) are two isomers of Isosorbide. D-isosorbide was used in this invention but isomers of D-isosorbide are expected to work as well. Isomers of isosorbide useful with the invention are illustrated in FIG. 4.

Examples of suitable polyols for forming the acid-functional polyester include: 1,2-ethanediol (ethylene glycol), 1,3-propanediol, 1,4-butanediol, 1,6-hexanediol, 1,10-decanediol, 1,12-dodecanediol, 1,4-cyclohexanedimethanol, diethylene glycol, triethylene glycol, neopentyl glycol, trimethylolpropane, hydrogenated bisphenol A (2,2-(dicyclohexanol)propane), 2,2,4-trimethyl-1,3-pentanediol, 2-methyl-1,3-propanediol, 2-methyl-2-hydroxymethyl-1,3-propanediol, 2-ethyl-2-hydroxymethyl-1,3-propanediol and the like, and combinations comprising at least one of the foregoing polyols. Since the current work targets maximizing biomass content, the preferred polyols are isosorbide (from corn stock) and dimer acid diol (from soybean stock), ethylene glycol and others may be used to enhance properties as needed.

Suitable polycarboxylic acids, acid esters and acid chlorides include those derived from succinic acid, adipic acid, azelaic acid, sebacic acid, 1,12-dodecanedioic acid, terephthalic acid, isophthalic acid, trimesic acid, tetrahydrophthalic acid, hexahydrophthalic acid, 1,4-cyclohexanedicarboxylic acid, trimellitic acid, naphthalene dicarboxylic acid, dimer acids, and the like, and combinations comprising at least one of the foregoing polycarboxylic acids. A preferred diester is the dimethyl ester of terephthallic acid. Dodecanedioic acid (DDA) is used as a modifier in several formulations. Diacids such as 1,4-cyclohexanedicarboxylic acid, Empol 1018®, Pripol 1013®, and the like can be used. A preferred diacid has a long chain to provide flexibility, thus a dimer acid having eight (8) or more carbons in the chain is preferred.

To obtain carboxyl-functional polyesters of desired molecular weight, the monomer mixture used to form the polyester typically has an appropriate excess of carboxyl functionality to hydroxyl functionality where the ratio of hydroxyl equivalents over acid equivalents is typically 0.85-0.95. The polyesters are typically amorphous.

Figure 5:
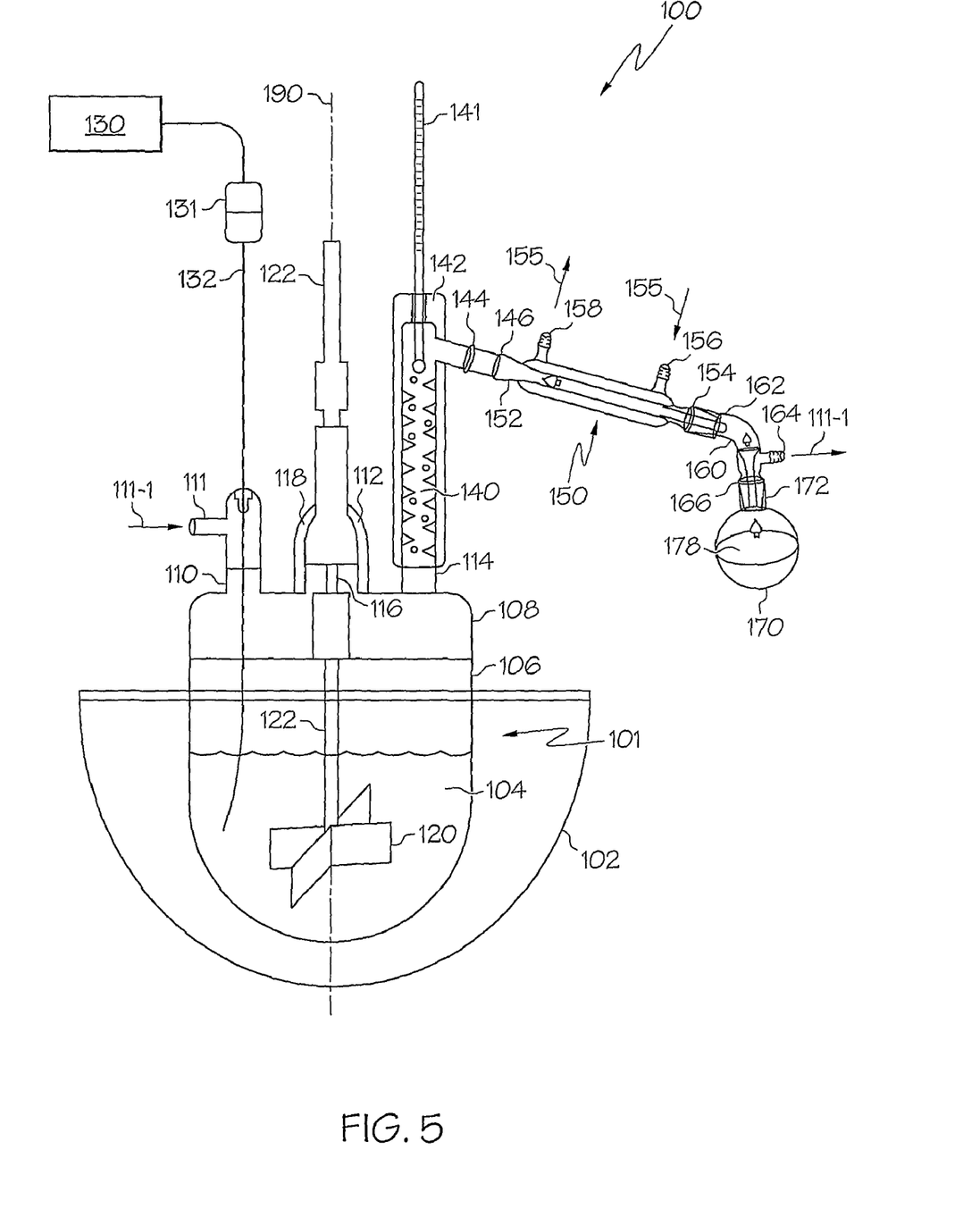
FIG. 5 is a schematic drawing showing the various elements of the apparatus used for making resin examples 1 through 3F.
Figure 6:
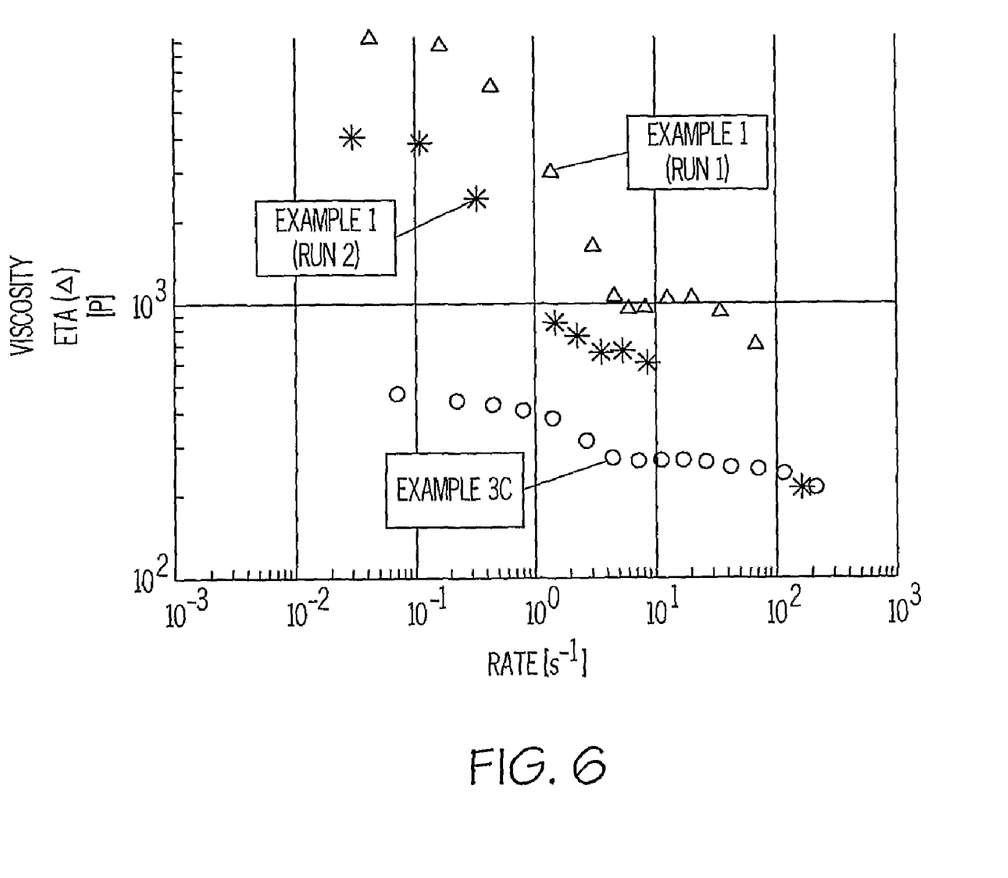
FIG. 6 is a graph that illustrates rheology curves for bio-based resins Examples 1 and 3C. The horizontal axis is the strain rate (1/second). The vertical axis shows Viscosity in Poise. These biobased resins are typical of those useful for toners.

Referring now to FIG. 5, this figure is a schematic drawing showing the various elements of the apparatus 100 used for making resins according to the invention. A heating mantle 102 surrounds reactor 101 at least in part and is used to control the temperature of reactor 101 containing reaction mixture 104. Reactor 101 consists of a reaction vessel 106 and top 108. Top 108 has multiple necks 110, 112, 114, 116 for connection to various appliances. Stirring is provided by paddle 120 (e.g. typically 45° angle blades) that is at the end of stirshaft 122 (e.g. stainless steel). Stirshaft 122 passes through neck 116. A thermocouple controller 130 connected to thermocouple 132 via connector 131 passes through neck 110 at gas inlet connector 111 in a sealed arrangement into reaction mixture 104. Vigreaux column 140 is mounted on neck 114 in sealed relationship. A thermometer 141 or other temperature measuring device is mounted at the top (distillation head) 142 of the Vigreaux column 140. Condenser 150 is mounted to the Vigreaux column 140 at neck 144 with connector 146 via condenser inlet 152. Vigreaux column 140 may be a separate unit surrounded by a jacket or the jacket and column may be unitary. Condenser outlet 154 is connected at neck inlet 162 of neck 160 that has a gas exit outlet 164, and neck outlet 166. Receiver flask 170 has an inlet 172 connected to neck outlet 166. Cooling liquid 155 enters condenser 150 at inlet 156 and exits at outlet 158.

In operation, argon gas 111-1 enters at gas inlet connector 111 to blanket reaction mixture 104 and flows out at gas exit 164. Ingredients can be added before the apparatus is closed or through sealed connector 118 at neck 112. Note that in FIG. 5, neck 112 is located directly behind neck 116. Neck 112 is located on the central axis 190 of reactor 101. Distillate 178 is collected in receiver flask 170.

The following examples are meant to be illustrative of various aspects of the invention and are not meant to limit the scope of the invention in any way.

Resin Production (Example 1 through Example 3F)

Example 1

This example illustrates the production of a hydroxyl functional bio-based polyester resin.

Equipment (see FIG. 5)

1 liter 4-neck cylindrical walled round bottom glass flask, jacketed Vigreaux column, distillation head, gas inlet and exit adapters, stainless steel stir shaft and four blade (45° angle) paddle, condenser, and receiver flask.

Procedure

The reactor was charged with dimethyl terephthalate (DMT) (228.30 g, 1.1757 moles), Speziol C36/2 1075® dimer diol (Batch # 415252) (77.61 g, 0.1411 moles), D-isosorbide (123.90 g, 0.84785 moles), and ethylene glycol (EG) (102.81, 1.6563 moles), followed by manganese (II) acetate tetrahydrate (0.0917 g), cobalt (II) acetate tetrahydrate (0.0618 g), and antimony (III) oxide (0.103 g). The reactor was blanketed with argon. Then, 1,2,3,4-tetrahydronaphthalene (2 ml) was added to the reaction mixture under argon. The temperature of the reactor contents was raised to 200° C. with stirring (after solids melted) under argon. This temperature was maintained for 30 minutes. The reaction mixture was slowly heated to 250° C. over a 30 minute period (1.6° C./min). This temperature was maintained for 30 minutes or until the temperature dropped at the top of the Vigreaux column to 30° C. or less. Methanol was continuously collected as the reaction was heated above approximately 150° C. When the temperature drops at the top of the Vigreaux column, this indicates that the methanol has been removed. Approximately 95 ml of methanol was distilled over. Subsequently, a solution of polyphosphoric acid (0.0634 g) in EG (1 g) was added to the reaction mixture. The argon flow rate over the reaction mixture was checked and when necessary, reduced to a slow rate in order to avoid distilling over isosorbide. The reaction mixture was slowly heated to 280° C. over 2 hour period (0.25° C./min). The distillate receiver was replaced with the vacuum receiver and vacuum was gradually applied (<1 Torr). During this time, ethylene glycol distilled off (91 g), and a low molecular weight polymer formed. The reaction mixture temperature was maintained at 280° C. for 3 hours and 10 minutes. The reaction was terminated by blanketing the reaction mixture with argon to obtain atmospheric pressure. The reaction mixture was then cooled to ≦250° C. and poured onto a fluorinated fiber glass sheet.

A resin was produced having the following properties:

Solution inherent viscosity: 0.29 (solvent is o-chlorophenol, only 92% soluble)

$T_g$=61° C.

Hydroxyl Value=24.3

Acid Value=8.0

Molecular Weight (MW)=3470 (Calculated from acid and hydroxyl values)

Polymer Characteristics:

Color: Brown

Tackiness: Non-tacky

Clarity: Slightly translucent

Flexibility: Brittle

Solid

Example 1A

This example illustrates the production of a bio-based polyester resin.

Equipment (see FIG. 5)

1 liter 4-neck cylindrical walled round bottom glass flask, jacketed Vigreaux column, distillation head, gas inlet and exit adapters, stainless steel stir shaft and four blade (45° angle) paddle, condenser, and receiver flask.

Procedure

The reactor was charged with dimethyl terephthalate (DMT) (197.74 g, 1.0183 moles), D-isosorbide (119.05 g, 0.81463 moles), and Speziol C36/2 1075® dimer diol (Batch # 415252) (112.06 g, 0.20371 moles), followed by 1,2,3,4-tetrahydronaphthalene (2 ml) and antimony (III) oxide (0.089 g). The reactor was blanketed with argon. The temperature of the reactor contents was raised to 200° C. with stirring (after solids melted) under argon. This temperature was maintained for 12 minutes. The reaction mixture was slowly heated to 250° C. over a 20 minute period (2.5° C./min). This temperature was maintained for 8 minutes. Methanol was continuously collected as the reaction was heated above approximately 150° C. When the temperature drops at the top of the Vigreaux column, this indicates that the methanol has been removed. Approximately 83 ml of methanol was distilled over. The argon flow rate over the reaction mixture was checked and when necessary, reduced to a slow rate in order to avoid distilling over isosorbide. The reaction mixture was slowly heated to 280° C. over 13 minute period (2.3° C./min). Then, the reaction mixture was allowed to cool to 260° C. Additional D-isosorbide (14.87 g, 0.1018 moles) was charged to the reaction mixture. The reaction mixture was heated to 280°. This temperature was maintained for 30 minutes. The distillate receiver was replaced with the vacuum receiver and vacuum was gradually applied (≦9 Torr). During this time, a low molecular weight polymer formed. The reaction mixture temperature was maintained at 280° C. for 2 hours and 40 minutes. The reaction was terminated by blanketing the reaction mixture with argon to obtain atmospheric pressure. The reaction mixture was then cooled to ≦250° C. and poured onto a fluorinated fiber glass sheet.

A resin was produced having the following properties:

Solution inherent viscosity: 0.10 (solvent is o-chlorophenol)

$T_g$=165° C.

Hydroxyl Value=45.0

Acid Value=2.3

Molecular Weight (MW)=2372 (Calculated from acid and hydroxyl values)

Polymer Characteristics:

Color: Light Brown

Tackiness: Tacky

Clarity: Translucent

Flexibility: Somewhat Brittle

Solid

Example 2

This example illustrates the production of a carboxyl functional bio-based polyester resin.

Equipment (see FIG. 5).

5 liter round bottom glass reaction vessel with 4 neck top, jacketed Vigreaux column, distillation head, gas inlet and exit adapters, stainless steel stir shaft and four blade (45° angle) paddle, condenser, and receiver flask.

Procedure

The reactor was charged with D-isosorbide (1337.0 g, 9.1490 moles) (as received), Pripol 1013® dimer acid (batch # 091687) (699.1 g, 1.215 moles), and 1,4-cyclohexanedicarboxylic acid (1,4-CHDA) (1563.8 g, 9.0826 moles) followed by antimony (III) oxide (1.231 g). The reactor was blanketed with argon. Then, 1,2,3,4-tetrahydronaphthalene (2 ml) was added to the reaction mixture under argon. The temperature of the reactor contents was raised to 200° C. with stirring (after solids melted) under argon. This temperature was maintained for 30 minutes. The reaction mixture was slowly heated to 250° C. over a 47 minute period (1.1° C./min). This temperature was maintained for 3.1 hours or until the temperature dropped at the top of the Vigreaux column to 30° C. or less. Water was continuously collected as the reaction was heated above approximately 180° C. When the temperature drops at the top of the Vigreaux column, this indicates that most of the water has been removed. Approximately 329 ml of water distilled over. The argon flow rate over the reaction mixture was checked and when necessary, reduced to a slow rate in order to avoid distilling over isosorbide. The reaction mixture was slowly heated to 280° C. over a 2 hour period (0.25° C./min). The distillate receiver was replaced with the vacuum receiver and vacuum was gradually applied (<1 Torr). During this time, residual water distilled over, and a low molecular weight polymer formed. The reaction mixture temperature was maintained at 280° C. for 3 hours and 10 minutes. The reaction was terminated by blanketing the reaction mixture with argon to obtain atmospheric pressure. The reaction mixture was then cooled to ≦250° C. and poured onto a fluorinated fiber glass sheet.

A resin was produced with the following properties:

$T_g$=64.2° C.

Acid Value=34.8

Molecular Weight (MW)
 GPC (polystyrene standard) $M_n$=1689
 GPC (polystyrene standard) $M_w$=11681
 Polydispersity ($M_w/M_n$)=6.91

Polymer Characteristics:

Color: Light Amber

Tackiness: Non-Tacky

Clarity: Translucent

Flexibility: Brittle

Solid

Example 3

This example illustrates the production of a carboxyl functional bio-based polyester resin.

Equipment (see FIG. 5).

1 liter 4-neck cylindrical walled round bottom glass flask, jacketed Vigreaux column, distillation head, gas inlet and exit adapters, stainless steel stir shaft and four blade (45° angle) paddle, condenser, and receiver flask.

Procedure

The reactor was charged with 1,4-cyclohexanedicarboxylic acid (1,4-CHDA) (204.66 g, 1.1886 moles), Empol 1018® dimer acid (batch # U42G151910) (72.54 g, 0.1251 moles), and D-isosorbide (172.80 g, 1.1824 moles) followed by antimony (III) oxide (0.1594 g) The reactor was blanketed with argon. Then, 1,2,3,4-tetrahydronaphthalene (2 ml) was added to the reaction mixture under argon. The temperature of the reactor contents was raised to 200° C. with stirring (after solids melted) under argon. This temperature was maintained for 30 minutes. The reaction mixture was slowly heated to 250° C. over a 30 minute period (1.6° C./min). This temperature was maintained for 30 minutes or until the temperature dropped at the top of the Vigreaux column to 30° C. or less. Water was continuously collected as the reaction was heated above approximately 180° C. When the temperature drops at the top of the Vigreaux column, this indicates that most of the water has been removed. Approximately 47 ml of water distilled over. The argon flow rate over the reaction mixture was checked and when necessary, reduced to a slow rate in order to avoid distilling over isosorbide. The reaction mixture was slowly heated to 280° C. over 2 hour period (0.25° C./min). The distillate receiver was replaced with the vacuum receiver and vacuum was gradually applied (<1 Torr). During this time, residual water distilled off and a low molecular weight polymer formed. The reaction mixture temperature was maintained at 280° C. for 3 hours and 10 minutes. The reaction was terminated by blanketing the reaction mixture with argon to obtain atmospheric pressure. The reaction mixture was then cooled to ≦250° C. and poured onto a fluorinated fiber glass sheet.

A resin was produced having the following properties:

Solution inherent viscosity=0.25 dl/g (solvent is o-chlorophenol):

$T_g$=66.9° C.

Hydroxyl Value=13.0

Acid Value=36.3

Molecular Weight (MW)
 GPC (polystyrene standard) $M_w$=2995
 GPC (polystyrene standard) $M_w$=9560
 Polydispersity ($M_w/M_n$)=3.19

Polymer Characteristics:

Color: Light Brown

Tackiness: Non-tacky

Clarity: Mostly Translucent

Flexibility: Brittle but hard.

Solid

Example 3B

This example illustrates the production of a hydroxyl functional bio-based polyester resin.

Equipment (see FIG. 5)

1 liter 4-neck cylindrical walled round bottom glass flask, jacketed Vigreaux column, distillation head, gas inlet and exit adapters, stainless steel stir shaft and four blade (45° angle) paddle, condenser, and receiver flask.

Procedure

The reactor was charged with dimethyl terephthalate (DMT) (228.30 g, 1.1757 moles), Speziol C36/2 1075® dimer diol (Batch # 415252) (129.40 g, 0.23523 moles), D-isosorbide (123.90 g, 0.84785 moles), and ethylene glycol (EG) (89.66 g, 1.444 moles), followed by manganese (II) acetate tetrahydrate (0.0917 g), cobalt (II) acetate tetrahydrate (0.0618 g), and antimony (III) oxide (0.103 g). The reactor was blanketed with argon. Then, 1,2,3,4-tetrahydronaphthalene (2 ml) was added to the reaction mixture under argon. The temperature of the reactor contents was raised to 200° C. with stirring (after solids melted) under argon. This temperature was maintained for 30 minutes. The reaction mixture was slowly heated to 250° C. over a 30 minute period (1.6° C./min). This temperature was maintained for 30 minutes or until the temperature dropped at the top of the Vigreaux column to 30° C. or less. Methanol was continuously collected as the reaction was heated above approximately 150° C. When the temperature drops at the top of the Vigreaux column, this indicates that the methanol has been removed. Approximately 95 ml of methanol was distilled over. Subsequently, a solution of polyphosphoric acid (0.0634 g) in EG (1 g) was added to the reaction mixture. The argon flow rate over the reaction mixture was checked and when necessary, reduced to a slow rate in order to avoid distilling over isosorbide. The reaction mixture was slowly heated to 280° C. over a 30 minute period (1° C./min). The distillate receiver was replaced with the vacuum receiver and vacuum was gradually applied (<1 Torr). During this time, ethylene glycol distilled off (84 g), and a low molecular weight polymer formed. The reaction mixture temperature was maintained at 280° C. for 3 hours and 10 minutes. The reaction was terminated by blanketing the reaction mixture with argon to obtain atmospheric pressure. The reaction mixture was then cooled to ≦250° C. and poured onto a fluorinated fiber glass sheet.

A resin was produced having the following properties:

Solution inherent viscosity: 0.19 (solvent is o-chlorophenol)

$T_g$=28.4° C.

Hydroxyl Value=35.4

Acid Value=6.1

Molecular Weight (MW)=2700 (Calculated from acid and hydroxyl values)

Polymer Characteristics:

Color: Brown

Tackiness: Non-tacky

Clarity: Mostly translucent

Flexibility: Brittle

Solid

Example 3C

This example illustrates the production of a hydroxyl functional bio-based polyester resin.

Equipment (see FIG. 5)

1 liter 4-neck cylindrical walled round bottom glass flask, jacketed Vigreaux column, distillation head, gas inlet and exit adapters, stainless steel stir shaft and four blade (45° angle) paddle, condenser, and receiver flask.

Procedure

The reactor was charged with dimethyl terephthalate (DMT) (213.96 g, 1.1018 moles), Empol 1018® dimer acid (Batch # U42G151910) (71.02 g, 0.1225 moles), D-isosorbide (128.79 g, 0.88128 moles), and ethylene glycol (EG) (116.28 g, 1.8734 moles), followed by manganese (II) acetate tetrahydrate (0.0859 g), cobalt (II) acetate tetrahydrate (0.0579 g), and antimony (III) oxide (0.0965 g). The reactor was blanketed with argon. Then, 1,2,3,4-tetrahydronaphthalene (2 ml) was added to the reaction mixture under argon. The temperature of the reactor contents was raised to 200° C. with stirring (after solids melted) under argon. This temperature was maintained for 30 minutes. The reaction mixture was slowly heated to 250° C. over a 30 minute period (1.6° C./min). This temperature was maintained for 30 minutes or until the temperature dropped at the top of the Vigreaux column to 30° C. or less. Methanol was continuously collected as the reaction was heated above approximately 150° C. When the temperature drops at the top of the Vigreaux column, this indicates that the methanol/water mixture has been removed. Approximately 93 ml of methanol/water mixture was distilled over. Subsequently, a solution of polyphosphoric acid (0.0594 g) in EG (1 g) was added to the reaction mixture. The argon flow rate over the reaction mixture was checked and when necessary, reduced to a slow rate in order to avoid distilling over isosorbide. The reaction mixture was slowly heated to 280° C. over 2 hour period (0.25° C./min). The distillate receiver was replaced with the vacuum receiver and vacuum was gradually applied (<1 Torr). During this time, ethylene glycol distilled off (95 g), and a low molecular weight polymer formed. The reaction mixture temperature was maintained at 280° C. for 3 hours and 10 minutes. The reaction was terminated by blanketing the reaction mixture with argon to obtain atmospheric pressure. The reaction mixture was then cooled to ≦250° C. and poured onto a fluorinated fiber glass sheet.

A resin was produced having the following properties:

Solution inherent viscosity: 0.23 (solvent is o-chlorophenol)

$T_g$=58.8° C.

Hydroxyl Value=23.7

Acid Value=1.4

Molecular Weight (MW)=4470 (Calculated from acid and hydroxyl values)

Polymer Characteristics:

Color: Light Brown

Tackiness: Non-tacky

Clarity: Somewhat translucent, slight haze

Flexibility: Brittle

Solid

Example 3F

Pigment Dispersion Agent

This example illustrates the production of a carboxyl functional bio-based polyester resin.

Equipment (see FIG. 5).

Two liter round bottom glass reaction vessel with 4 neck top, jacketed Vigreaux column, distillation head, gas inlet and exit adapters, stainless steel stir shaft and four blade (45° angle) paddle, condenser, and receiver flask.

Procedure

The reactor was charged with D-isosorbide (545.35 g, 3.7317 moles) (as received), Pripol 1013® dimer acid (batch # 091687) (272.17 g, 0.47302 moles), and 1,4-cyclohexanedicarboxylic acid (1,4-CHDA) (632.49 g, 3.6734 moles) followed by antimony (III) oxide (0.498 g). The reactor was blanketed with argon. Then, 1,2,3,4-tetrahydronaphthalene (2 ml) was added to the reaction mixture under argon. The temperature of the reactor contents was raised to 200° C. with stirring (after solids melted) under argon. This temperature was maintained for 30 minutes. The reaction mixture was slowly heated to 250° C. over a 30 minute period (1.6° C./min). This temperature was maintained for 2.1 hours. Water was continuously collected as the reaction was heated above approximately 180° C. When the temperature drops at the top of the Vigreaux column, this indicates that most of the water has been removed. Approximately 134 ml of water distilled over. The argon flow rate over the reaction mixture was checked and when necessary, reduced to a slow rate in order to avoid distilling over isosorbide. The reaction mixture was slowly heated to 280° C. over a two hour period (0.25° C./min). The distillate receiver was replaced with the vacuum receiver and vacuum was gradually applied (<1 Torr). During this time, residual water distilled over, and a low molecular weight polymer formed. The reaction mixture temperature was maintained at 280° C. for 30 minutes. The reaction was terminated by blanketing the reaction mixture with argon to obtain atmospheric pressure. The reaction mixture was then cooled to $\leq$250° C. and poured onto a fluorinated fiber glass sheet.

A resin was produced with the following properties:

$T_g$=52.9° C.

Acid Value=47.7

Viscosity at 120° C.=7772 Poise

Viscosity at 160° C.=247 Poise

Polymer Characteristics:

Color: Yellow/Light Amber

Tackiness: Non-Tacky

Clarity: Translucent

Flexibility: Brittle

Solid

The following examples Formula 1 through Formula 6 illustrate several typical toner formulations according to the invention.

Formula 1

A toner formulation was prepared using a polyester resin derived from isosorbide (corn derivative) and dimer diol (soybean derivative) from Example 1, and carbon black produced by Cabot Corporation.

It was found that it was more difficult to micronize the bio-based polyester toner than a standard original equipment manufacturer toner. This was attributed to the higher molecular weight of the bio-based polyester. Typically, toners have average particle sizes of less than 30 μm. The bio-based polyester toner (resin plus colorant) had an average particle size of 24 μm. However, in another micronization test the bio-based polyester resin without carbon black, the particle size was reduced to 14 μm. This shows that the resin by itself is processable.

TABLE 1

| Bio-Based Polyester Toner Resin Containing Dimer Diol | |
|---|---|
| Developer Formula | |
| Bio Polyester Toner | 1.143 g |
| Carrier FC-2 (silica sand coated on methyl terpolymer) | 17.862 g |
| Degussa R-972 (charge control agent) | 0.011 g |

The average tribo-electric charge was found to be −11.2 microCoulomb/g.

The blending of colorant was 90 wt % resin and 10 wt % carbon black.

Formula 2

A toner formulation using the resin from Example 3C was prepared. 90 g of soy based resin from example 3C was blended with 10 g of Raven 5250 CB on a Thropp 2 roll steam mill at a processing temperature of about 285-300° F. for 20 to 30 minutes. About 98.98 g of blended material was recovered from the 2 roll mill.

The blended material was then broken up and mixed with dry ice to chill. Material was run through Hammermill 1 and passed through a 10 mil screen and collected for micronizing. Material recovery from Hammermill 1 was 50.56 g (note: some material was spilled during recovery). The hammermill treated toner formulation was micronized to the appropriate particle size (<20 um volume average) with an air Sturtevant mill (Model No. Mikropul # 630) at 87 psi grind pressure, 70 psi feed pressure and a number 3 setting on the vibrator feed tray. The approximate material feed rate was 0.14 grams/minute.

The toner formulation mean particle size was, by volume, 11.7 microns with a mean diameter, based on number, of 3.4 microns.

Developers were prepared using the FC-2 carrier at a concentration of 4% micronized resin and carbon black, on the carrier. Toner Formula 2 when mixed with the carrier obtained an average tribo-electric charge of about −14.2 microCoulomb/g. It is expected that the resin has a large enough negative charge to produce good images.

An image was prepared from soy based toner made from resin or example 3C using a Model D Xerox copier.

Formula 3 Preparation 90 g of carboxyl functional soy resin from Example 2 is blended with 10 g of Raven 5250 CB. The same processing conditions and steps as in preparation of Formula 2 are followed. A toner having a negative charge similar to that in Formula 2 is expected.

Formula 4 Preparation

This example illustrates a negative tribo-electric charge toner. 90 g of carboxyl functional soy resin from Example 3 is blended with 10 g of Raven 5250 CB. The same processing conditions and steps as in preparation of Formula 2 are followed. A toner having a negative charge similar to that in Formula 2 is expected.

Formula 5 Preparation

This example illustrates the preparation of a positive triboelectric charge toner.

Toner was prepared from 90 wt % of resin from example 1 was milled with 10 wt % carbon black (from Cabot Corporation) was blended in the Thropp 2 roll mill at the same conditions as Formula 2. Toner was milled in the Sturtevant mill at the following conditions: feed pressure of 60 psi, grind pressure of 90 psi, and feed rate of 0.2 g/minute.

FBF-300 carrier (Powdertech Co. Ltd.) was used. The carrier has a core material of copper oxide (~14%), zinc oxide (~15%), and iron oxide (~71%) and is coated with a silicone resin. The carrier was blended on the roll mill with the toner. The amount and type of carrier can be adjusted to control and obtain a desired tribo-electric charge.

A toner having a positive average tribo-electric charge of about +3.6 microCoulomb/g was obtained. The charge although lower than expected can be enhanced with a charge control agent.

Developer Formulation 1

This example illustrates the preparation and use of a developer such as that associated with a copy machine using negatively charged carrier and toner. The toner for use in this example was prepared as in Formulation 2. Materials used for the developer were 200.0 g of FC-2 carrier, 8.0 g of micronized toner formulation, and 0.0418 g of Aeorosil R-972 charge control agent. The resultant average tribo-electric charge was −13.9 microCoulomb/g.

The developer was used to make an image using a Model D Xerox copier. The image transferred well and had better image quality than the image produced without the charge control agent.

Dispersion Tests

The resin of Example 3F was evaluated for its pigment dispersion properties with color concentrates Materials:

Two color concentrate formulas were chosen. One was a 10% loaded phtalo blue (PB) 15:3(PB) in a polystyrene carrier resin and the other was a custom green in an acrylonitrile butadiene styrene copolymer (ABS) based carrier resin. The custom green consisted of a blend of organic and inorganic pigments and was about 18% loaded. Control samples were run with typical dispersants such as zinc stearate and a combination of zinc stearate and ethylene bistearamide dispersants and the samples were run with the dispersant aid from Example 3F.

Compounding:

Compounding was done in a co-rotating 18 mm diameter Leistritz twin screw extruder.

Testing:

Dispersion testing was done using filter tests and the pressure build up was reported in bar/gram of pigment. This is a quantitative test for dispersion and a lower value indicates better dispersion.

Table 17 shows the formulations used for tests and the results.

TABLE 17

| Formula number | Pigment | Carrier resin | Dispersion aids | Filter test value Bar/gm pigment |
|---|---|---|---|---|
| A | 10% PB 15:3 | polystyrene | Zinc stearate | 8.5 |
| B | 10% PB 15:3 | polystyrene | Example 3F | 4.5 |
| C | 18% blend | ABS | EBS and Zinc stearate | 0.82 |
| D | 18% blend | ABS | Example 3F | 0.55 |

PB = phtalo blue
ABS = acrylonitrile butadiene styrene copolymer
EBS = ethylene bistearamide The comparison with a commercial dispersant zinc stearate, and a mixture or EBS and zinc stearate showed good results. The results showed constant superior color development in two different polymer systems.

Proteins as disclosed in WO 04/077,169 are useful with the invention. The proteins useful with the invention may be derived from animal or plant sources such as soya protein, zein, collagen, casein, protein albumen, fish proteins and the like. Protein content of the toner can range from about) 0 wt % to about 20 wt % is useful. More preferred is a protein content of about 0.1 wt % to about 10 wt %. The protein provides improved deinking properties.

While the forms of the invention herein disclosed constitute presently preferred embodiments, many others are possible. It is not intended herein to mention all of the possible equivalent forms or ramifications of the invention. It is to be understood that the terms used herein are merely descriptive, rather than limiting, and that various changes may be made without departing from the spirit of the scope of the invention.

We claim:

1. A thermoplastic toner composition comprising: a mixture of,
   a. an amorphous thermoplastic polymer comprising
      a carboxyl or hydroxyl functional polyester wherein the carboxyl or hydroxyl functional polyester is derived from a dianhydrohexitol, a first diacid moiety, and a second diacid moiety, optionally a monoacid may also be included;
      and
      wherein the polymer is derived from at least one bio-based monomer;
      and the polymer has a $T_g$ between about 50° C. and about 80° C.;
   b. a coloring agent dispersed in the amorphous thermoplastic polymer; and
      wherein the toner comprises a powder having a mean particle size of less than about 30 μm.

2. The thermoplastic toner composition according to claim 1, comprising a carboxyl functional polyester having improved color dispersion properties.

3. The thermoplastic toner composition according to claim 1, wherein the toner further comprises:
   c. protein.

4. The toner according to claim 1, wherein the dianhydrohexitol comprises an isosorbide moiety, the first diacid is 1,4-cyclohexanedicarboxylic acid, and the second diacid is a long chain diacid having eight or more carbon atoms in the chain.

5. The toner according to claim 1, wherein the toner comprises at least 5 wt % biomass.

6. The toner according to claim 5, wherein the toner comprises particles that have a mean particle size of less than about 20 micrometers.

7. The toner according to claim 1, comprising:
   d. an excipient selected from the group consisting of charge control agents, flow control agents, lubricants, anticaking agents, and mixtures thereof.

8. The toner according to claim 1, wherein the toner has a negative or positive tribo-electric charge of between about 10 to about 40 microCoulomb/g.

9. The toner according to claim 8, wherein the toner has a negative tribo-electric charge of between about 10 to about 20 microCoulomb/g.

10. The toner according to claim 1, wherein the toner has a negative tribo-electric charge.

11. The toner according to claim 1, wherein the thermoplastic comprises a polystyrene acrylate mixed with the polyester.

12. An image comprising:
   a substrate and a toner according to claim 1 applied to the substrate.

13. A toner comprising:
   (1) a thermoplastic polyester resin comprising the reaction product of
      A. a dianhydrohexitol;
      B. a dimer diol and/or a dimer diacid;
      C. a diacid, diester, or diacid chloride; and
      D. an optional catalyst; and
   (2) a pigment.

14. A developer comprising:
   (1) a thermoplastic polyester resin comprising the reaction product of
      A. a dianhydrohexitol;
      B. a dimer diol and/or a dimer diacid;
      C. a diacid, diester, or diacid chloride; and
      D. an optional catalyst;
   (2) a pigment; and
   (3) a carrier.

15. The developer according to claim 14, wherein the developer comprises a magnetic material.

* * * * *